United States Patent [19]

Murto

[11] 3,776,191
[45] Dec. 4, 1973

[54] CONVEYOR AND TROUGH FEEDER FOR POULTRY AND THE LIKE

[75] Inventor: Robert A. Murto, Goshen, Ind.

[73] Assignee: Chore-Time Equipment, Inc., Milford, Ind.

[22] Filed: Aug. 29, 1972

[21] Appl. No.: 284,615

[52] U.S. Cl. ............................ 119/18, 119/52 AF
[51] Int. Cl. .............................................. A01k 5/00
[58] Field of Search ................... 119/52 AF, 52 B, 119/53, 18, 17

[56] References Cited
UNITED STATES PATENTS

| | | | |
|---|---|---|---|
| 3,134,478 | 5/1964 | Haer et al. | 119/52 AF |
| 2,657,831 | 11/1953 | Pierce | 119/52 AF |
| 2,918,037 | 12/1959 | Polley | 119/52 AF |
| 2,794,421 | 6/1957 | Rose et al. | 119/52 AF |

Primary Examiner—Louis G. Mancene
Assistant Examiner—J. N. Eskovitz
Attorney—Roy H. Olson et al.

[57] ABSTRACT

A novel poultry feeding trough and channel feed conveyor is described. The conveyor channel is provided with two series of circumferentially offset dispensing slots arrayed in a herringbone pattern to encourage equalized feed distribution along the trough length. Equalized feed distribution is further encouraged by orienting the conveyor channel in a diagonal position relative to the trough bottom. To move the feed along the channel conveyor, an auger having a series of spiral flights is included, the flights being formed with either a right hand or a left hand spiral. The elongate edges of the first series of the dispensing holes are oriented substantially parallel to the auger flights, if the auger flights have a right hand spiral. The elongate edges of the second series of holes are oriented parallel to the auger flights, if a left hand spiral auger is used.

6 Claims, 12 Drawing Figures

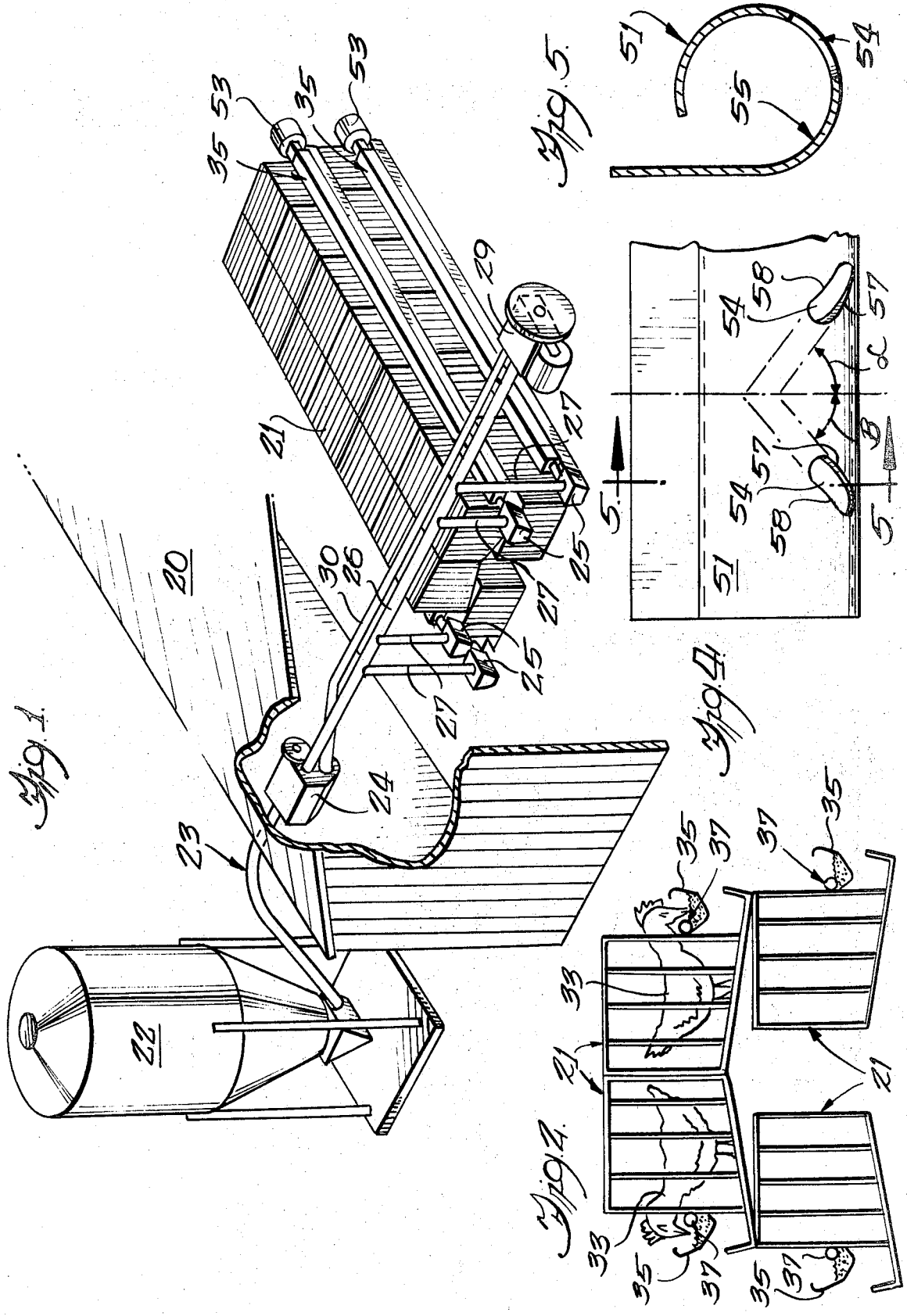

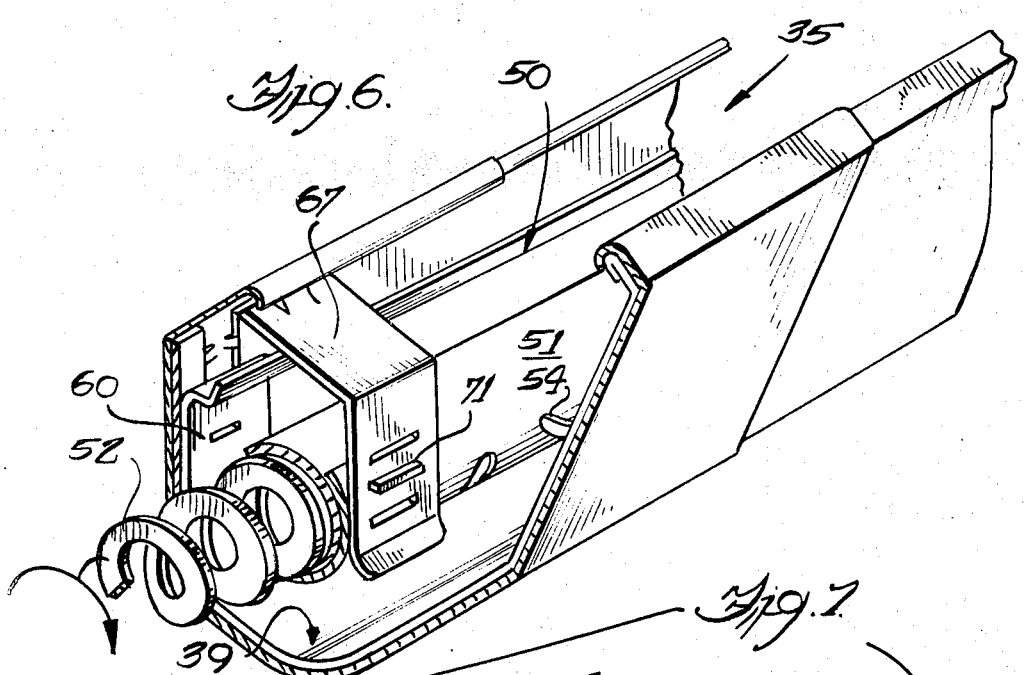
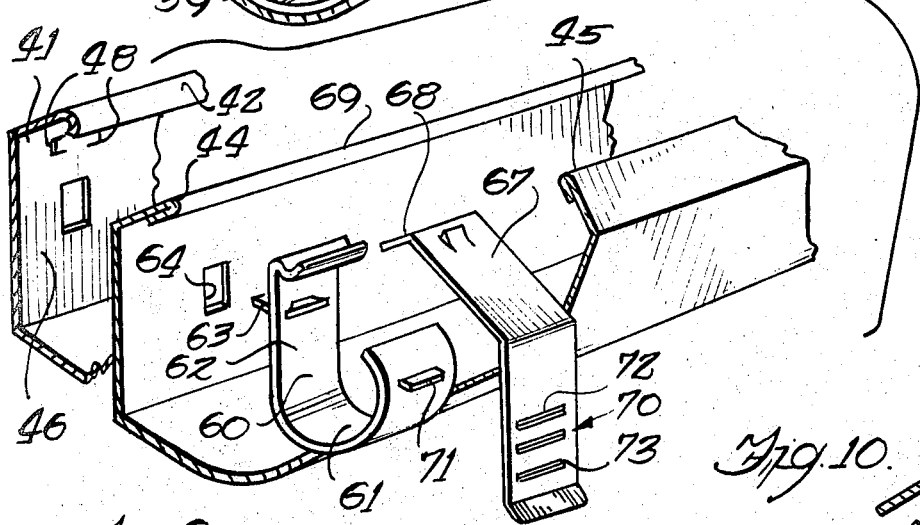
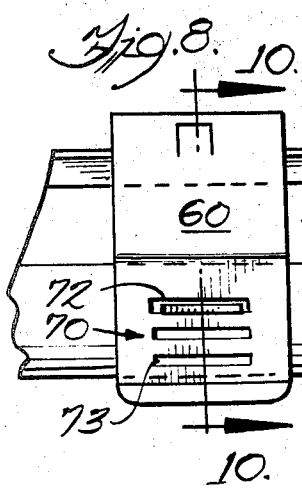
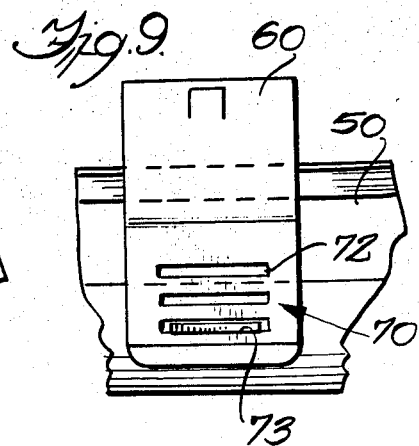
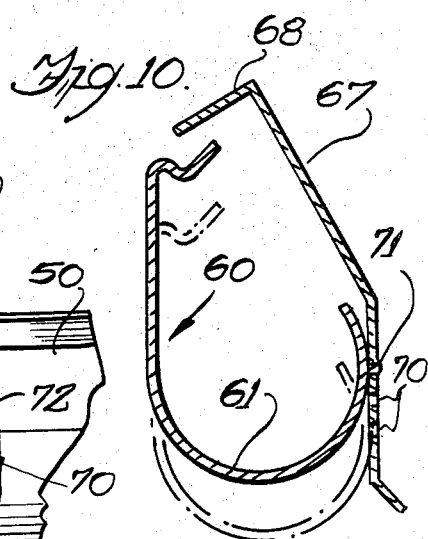

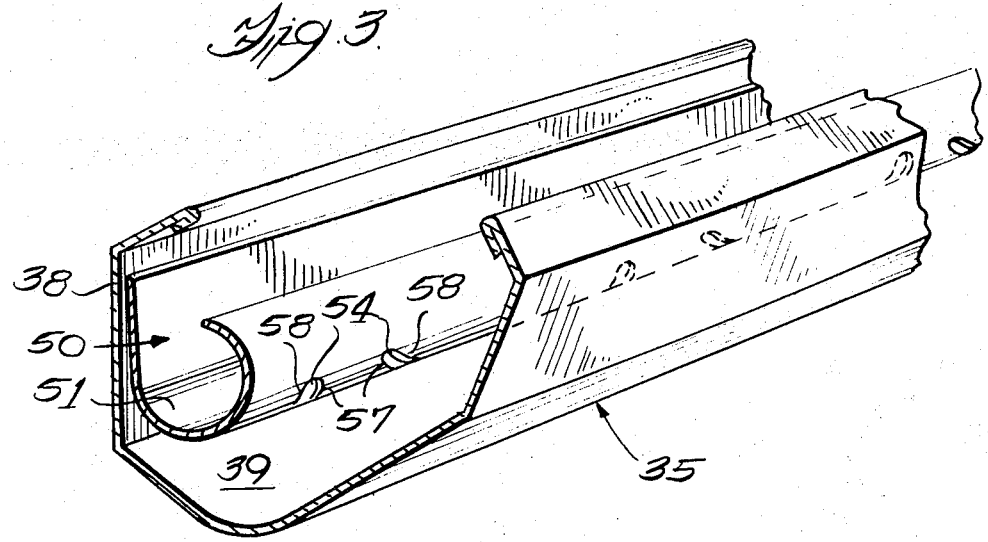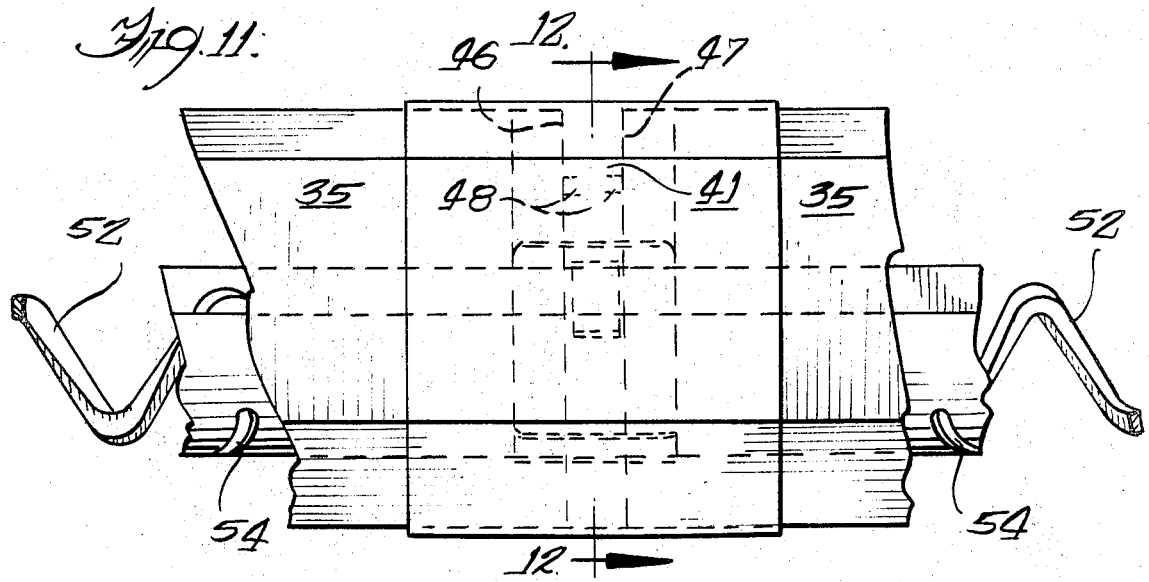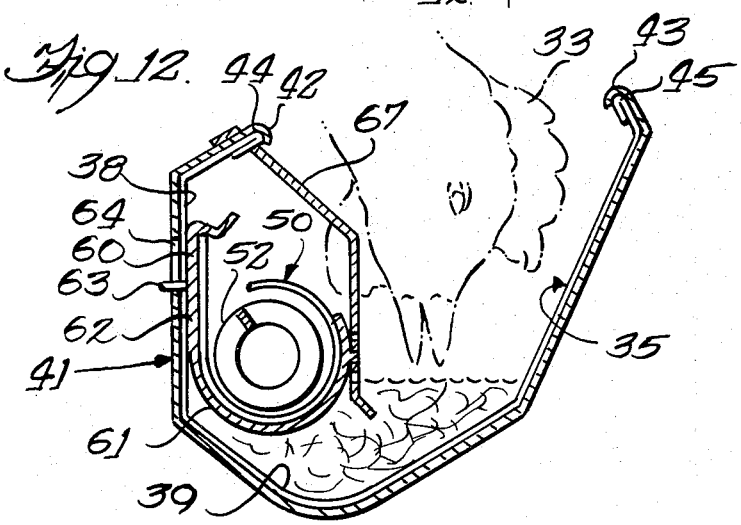

CONVEYOR AND TROUGH FEEDER FOR POULTRY AND THE LIKE

DESCRIPTION OF THE INVENTION

This invention relates generally to poultry feeding apparatus, and more particularly to a trough feeder wherein feed is distributed equally and uniformly for consumption by the associated flock.

In some modern poultry raising operations, the birds are kept in cages arranged in rows within an enclosed poultry house. To provide feed to the caged and relatively immobilized birds, an efficient and automatic feeding system is required. On such automatic bird feeding system is that described in U.S. Pat. No. 3,611,995 wherein a plurality of feeder lines are disposed adjacent the individual cage rows. Each feeder line includes an elongated trough structure into which the feed is deposited for consumption by the flock. Feed may be distributed along this trough by a channelized conveyor of a generally tubular construction. Rotation of an auger member causes the feed to be moved along the conveyor line and to be distributed through a series of holes formed in the channel member. The flights of the auger may be formed in either a right hand or a left hand spiral, depending upon the direction of rotation of the auger drive and the direction in which the feed is intended to be moved.

In such systems, it is important that an equalized amount of feed be distributed along the length of the trough. Unequal distribution of the feed may cause some members of the flock to go hungry while others are overfed, thereby leading to unequal growth and maturity rates among the birds, and consequent economic difficulty in flock management.

A wide variety of feed mixes are distributed to the flock by these systems, and each given mix containing a precise proportion of whole kernel grain, mash, pellets, and other ingredients. It is also important that the proper portion of each mix ingredient be evenly distributed along the entire length of the trough, in order that each member of the feeding flock is provided with a properly balanced diet.

It is therefore an object of the present invention to provide a poultry feed trough and associated feed conveyor which will encourage equalized feed delivery along the entire length of the trough.

It is a more specific object to provide a feed trough and associated feed conveyor which will encourage uniform delivery of the proper proportion of each feed mix constituent along the trough length.

It is another object to provide a poultry feed channel and auger conveyor device wherein the channel member may be used with equal facility with an auger having flights formed in either a right hand or a left hand spiral.

Yet another specific object of the invention is to provide a poultry feed trough and associated feed conveyor wherein the position of the conveyor may be adjusted relative to the trough to encourage the desired simultaneous and equalized feed delivery.

Other objects and advantages of the invention will become apparent upon reading the following detailed description and upon reference to the drawings. Throughout the drawings, like reference numerals refer to like parts.

FIG. 1 is a general perspective view showing a poultry feeding system embodying the present invention installed in a typical poultry house;

FIG. 2 is an elevational end view of the poultry cages contained in the poultry house and showing the cages, typical caged birds, and parts of the associated feeding system mechanism;

FIG. 3 is a perpsective view showing in further detail the trough and the associated feed conveyor mechanism;

FIG. 4 is a side elevational view showing in further detail the conveyor channel member shown in FIG. 3;

FIG. 5 is a sectional view taken substantially in the plane of line 5—5 in FIG. 4 and showing in further detail the construction of the conveyor channel member;

FIG. 6 is a perspective view similar to FIG. 3 showing the trough, conveyor channel, auger, and various trough connecting and channel positioning parts;

FIG. 7 is an exploded view similar to FIG. 6 and showing the trough section connecting and the conveyor channel member positioning parts;

FIG. 8 is a fragmentary elevational view of the conveyor channel positioning parts with the channel member carried in a relatively elevated position;

FIG. 9 is a fragmentary elevational view similar to FIG. 8 and showing the conveyor channel member positioning parts with the channel member carried in a relatively lowered position;

FIG. 10 is a sectional view taken substantially in the plane of line 10—10 in FIG. 8 and showing the conveyor channel member positioned in alternative raised and lowered positions;

FIG. 11 is a fragmentary elevational view showing the rear of the feed containing trough, the feed conveyor member, the contained auger, and associated connecting parts; and FIG. 12 is a sectional view taken substantially in the plane of line 12—12 in FIG. 11 and showing the trough and associated feed conveyor and a bird consuming feed from the trough.

Turning first to FIG. 1, there is shown a feeding system utilizing the present invention inside a poultry house 20 containing cages 21. These cages 21, of known construction, are arrayed in rows within the house 20 and are each sized to accommodate one or more birds.

Feed for the caged birds is stored in a bulk storage bin 22 which may be conveniently located outside the house 20. The feed is introduced into the house by a main conveyor 23, which may include a flexible tube and auger, and is distributed through a shunt hopper 24 to line hoppers 25 by a header conveyor 26 and associated drop tubes 27. To avoid waste of feed, excess feed which is not distributed to the line hoppers 25 is delivered to a return box 29 mounted at the downstream end of the header conveyor 26. This excess feed is re-routed by a return line 30 to the shunt hopper 24. Excess feed is thus continually re-circulated between the shunt hopper 24 and the return box 29. It is within the purview of the present invention that various time controls and feed level sensing mechanisms may be included for automatically operating the main conveyor 23 and feeding system parts, as further described in U.S. Pat. No. 3,611,995.

Food is distributed to individual birds 33 from the line hoppers 25 along elongated troughs 35 by means of channelized conveyors 37. Each trough 35 is formed with a side wall 38 which may be disposed or attached by convenient means not shown to the various poultry cages 21 in the associated line. Feed is collected and supported by a concave trough bottom 39.

To facilitate fabrication of the troughs, and to permit the assembly of troughs in any desired length, individual trough sections may be interconnected by trough connecting clips 41. As illustrated in FIGS. 7 and 12, these clips 41 are formed to fit securely about the outer periphery of the trough sections 35, and are provided with reverse-turned edges 42 and 43 which engage corresponding edges 44 and 45 of the trough sections. As illustrated in FIG. 11, the ends 46 and 47 of the adjacent trough sections 35 do not directly abut when connected by the clip 41 but are spaced apart a pre-determined distance by tangs 48 to permit the installation of conveyor-mounting parts hereinafter.

A channel conveyor 50 transports and distributes feed along the length of the trough 35. The channel conveyor 50 includes a channel member 51 disposed along the length of the trough 35 and mounted thereto. Rotatable within the channel member 51 is an auger 52, which, in the illustrated embodiment, is of the centerless variety, and which is formed into a number of spiral flights. Depending upon the direction of rotation of the auger drive 53 (see FIG. 1) and the direction in which it is intended that feed be moved along the conveyor 50 and trough 35, and flights may be formed in either a right hand or a left hand spiral.

To encourage even feed dispensation from the channel member 51 to the trough 35, the channel member 51 is provided with a plurality of feed dispensing openings which here take the shape of elongated slots 54. These slots 54 need not be disposed at the bottom dead center of the channel member 51, but can be formed in a linear array of circumferentially offset positions as illustrated in FIGS. 3 and 4. Adjacent to these slots 54 is a feed-carrying area 55 along which the undispensed feed is urged by the rotative motion of the auger 52.

To further encourage uniform distribution of feed along the length of the trough 35 and to simultaneously encourage distribution of uniform mounts of each feed mix constituent through each slot, the slots are provided with two substantially parallel elongated edges 57 and 58. An auger 52 having either right hand spiral flights or left hand spiral flights may be accommodated in the channel member 51 in accordance with another aspect of the invention, since the slots 54 are formed in two alternating series arrayed in a herringbone pattern as illustrated.

The first series of the slots 54 is formed with the parallel elongated edges of 57, 58 of the slots disposed at an angle α to a reference plane P passing perpendicularly through the channel member axis, as illustrated in FIG. 4. The second series of slots is oriented with the elongated edges 57, 58 thereof intersecting the reference plane P at a second angle β. Angles α and β are of substantially equal extent and opposite orientation relative to the reference plane P. Thus, alternating slots will have elongated edges 57 and 58 oriented substantially parallel to the flights of the rotating auger member, regardless of whether the auger member is provided with flights having a right hand or a left hand spiral. Manufacturing costs for the channel member are thereby reduced, since the same channel member may be used with either auger. In carrying out the invention, easy and positive feed flow through the dispensing slots is encouraged by forming each slot with a ratio of length to width of substantially 3:1.

Equalized feed flow along the trough length is also encouraged by the matter in which the channel member 51 is mounted within the trough 35. In general, the channel member 51 is mounted at a location spaced above the trough bottom 59, thereby permitting the dispensed feed to collect in a quantity sufficient to provide a reserve supply for the feeding fowl 33, as shown in FIG. 12. In the illustrated embodiment, the channel-to-trough connecting structure takes the form of a bracket 60 provided with a U-shaped cradle portion 61 for supporting the channel member 50, and a relatively planar back portion 62 formed to abut the rear wall 38 of the trough 35. A tang 63 is formed upon the bracket 60 to fit between the adjacent ends of trough section rear walls 38, as illustrated in FIG. 6. Alternatively, the tang may engage receiving slot 64 formed in the rear wall 38 of a single section of the trough 35, as illustrated in FIG. 7.

To locate the height of the supported channel member 50 in a pre-determined position relative to the trough bottom 39, the position of the bracket 60 and supported channel member 51 may be adjusted by means of an associated clip 67. The clip 67 has a tab 68 formed at its upper end to engage the top 69 of the trough 35, as illustrated in FIG. 7. At the bottom portion of the clip 67 are formed a plurality of slots 70. Any one of these slots 70 may be engaged by a finger 71 formed upon the front of the bracket 60; when the bracket 60, clip 67 and trough 35 are thus assembled as illustrated in FIGS. 7–12, the carried channel member 50 is supported at any one of a corresponding plurality of heights relative to the trough floor 39. For example, when the upper-most clip slot 72 is engaged by the corresponding bracket finger 71, as illustrated in FIG. 8, the conveyor member 51 is supported in a relatively elevated position. If, however, the finger 71 is inserted in the relatively low slot 73, the carrier member 50 is supported in a relatively lowered position, as shown in FIG. 9 and in dotted lines in FIG. 10. Thus, by positioning one end of the channel member 51 in a relatively low position and the opposite end of the channel member 51 in an elevated position, the channel member will be mounted to the trough in a relatively diagonal orientation, thereby encouraging the equal flow of feed along the length of the channel conveyor and consequently encouraging relatively equalized flow of feed from the conveyor channel member to the trough.

The invention is claimed as follows:

1. A device for feeding poultry and the like including an elongated trough having a side wall for disposition adjacent poultry stations, a bottom for collecting and supporting feed, and an open top providing access to the supported feed by the poultry, a channel conveyor for transporting and distributing feed equally along the length of the trough, said channel conveyor comprising a channel member having formed therein a plurality of elongated feed dispensing slots for dispensing feed from the channel member to the trough, an auger including a plurality of interconnected spiral flights rotatably disposed within the channel member for urging the feed along the channel member, and rigid connecting means affixing the channel member to the trough at a location above the trough bottom, said rigid connecting means including adjustable means to permit one end of the channel member to be affixed to said trough at a position relatively higher above the trough bottom than the opposite end, thereby mounting the channel member to the trough in a relatively diagonal orientation and encouraging an equalized flow of feed into the trough along the length of the channel conveyor.

2. A device according to claim 1 wherein said trough comprises individual trough sections, and a connector clip is provided for joining adjacent trough sections, said clip conforming to the periphery of the trough sections and having reverse-turned edges engaging corresponding edges of the trough sections, and further having means for spacing apart the adjacent trough sections at a pre-determined distance.

3. A device according to claim 1 including bracket means for connecting said channel conveyor to said trough, and clip means for positioning the bracket means and the carried channel conveyor in any one of a number of predetermined positions relative to the trough bottom, the clip and bracket means permitting one end of the conveyor to be supported in an elevated position and the other end in a low position relative to the trough bottom, thereby encouraging the equal flow of feed along the length of the channel conveyor and consequently encouraging relatively equalized flow of feed from the conveyor to the trough.

4. A device according to claim 1 wherein said feed dispensing slots are formed in two alternating series, the first series formed with the parallel elongate edges thereof disposed at a first angle to a reference plane passing perpendicularly through the channel member axis, and the second series of slots formed with the elongate edges disposed at a second angle to said reference plane, said second angle being of substantially equal extent and opposite orientation relative to said first angle, thereby providing said channel member with slots arrayed in a herringbone pattern and encouraging equalized feed distribution along the length of the trough.

5. A device according to claim 4 wherein the elongate edges of one series of said slots is oriented substantially parallel to the flights of said auger member, and wherein said auger member is formed with either a right hand or a left hand spiral.

6. The combination of an elongated trough for feeding poultry and the like and a diagonally disposed channel conveyor for transporting and distributing feed equally along the length of the trough, the trough having a side wall for disposition adjacent poultry stations, a bottom for collecting and supporting feed, and an open top providing access to the supported feed by the poultry, the channel conveyor comprising a channel member having formed therein a plurality of elongated feed dispensing slots for dispensing feed from the channel member to the trough, an auger including a plurality of interconnected spiral flights rotatably disposed within the channel member for urging the feed along the channel member, and means fixedly connecting the channel member to the trough side at a location above the trough bottom, said connecting means including adjustable means carrying one end of the channel member relatively higher above the trough bottom than the opposite end, thereby mounting the channel member to the trough in a relatively diagonal orientation and encouraging an equalized flow of feed into the trough along the length of the channel conveyor.

* * * * *